6215X
S. LANING.
Fruit-Gatherer.
Patented Nov. 1, 1830.
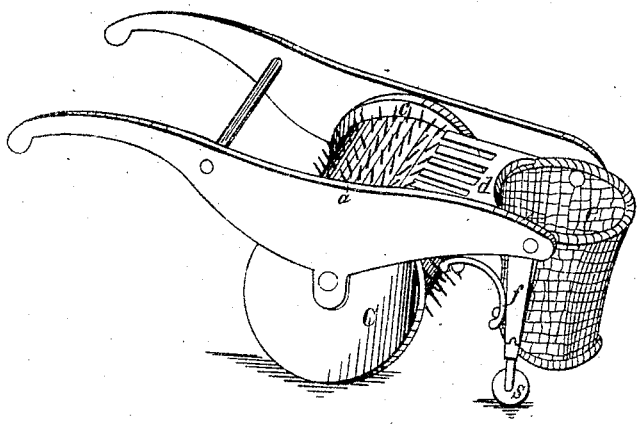

6215X

UNITED STATES PATENT OFFICE.

SAMUEL LANING, OF CAMDEN, NEW JERSEY.

MACHINE FOR GATHERING APPLES.

Specification forming part of Letters Patent dated November 1, 1830.

*To all whom it may concern:*

Be it known that I, SAMUEL LANING, of Camden, New Jersey, have invented an Improvement in a Machine or Apparatus for Gathering Apples, of which the following is a specification.

The invention consists of a machine, to pick up apples from the ground under the trees, about the size of a wheelbarrow, and something similar to it in shape, and is, like it, pushed along by two handles on a cylinder-wheel, the outer edges or extremities of which are projected three inches beyond its general diameter. This cylinder extends across the machine between the fore part of the handles or frame, and reaches from one handle or side piece to the other. It is the axle of the machine, enlarged by a frame, around the axle covered with boards, and thus raised to within three inches of the size or diameter of the wheels or outer raised edges on which the machine moves. This cylinder is driven full of teeth or small iron pickers, made of wire, disposed in rows around the cylinder and rising above or out of it two and a quarter inches and to within three-quarters of an inch of the level with the two outer edges, rims, or wheels on which the machine rests, and turns on the ground. The combs are a row of slats fastened to a shoulder, also of wood, representing the back of a comb, and which shoulder extends and is fastened across the top of the machine at the fore part and just above the top of the cylinder, so that the pickers thereon fastened pass under it just without touching. These slats or slips of wood extend from this shoulder longitudinally over the cylinder and pickers and toward the part of the handles held in the hands when in use. Between these strips, which are about an inch apart, the rows of pickers pass as the cylinder moves. The points of the pickers are sharpened, and they reach within three-quarters of an inch of the ground as the machine is pushed along, and thus fasten in the apples as the machine passes over them and carry them up in the revolution of the cylinder to the top, where they are disengaged by the comb as the pickers pass between the teeth of the comb or slats, and the apples, after being thus disengaged, are carried along the back of the comb into a basket suspended in front of the machine between the jaws or fore part of the handles. One of the wheels is fastened to the end of the cylinder and revolves with it. The other is loose or separate from the cylinder and revolves on the axle.

Small wooden balls are suspended by swivels from the front legs of the machine and drag on the ground immediately before the wheels to turn the apples out of their way.

The whole machine is composed of light wood, except the pickers, nails, fastenings, &c. The length of the frame from the end of the handles to the end of the same or jaws in front is five feet two inches; width of the machine and length of the cylinder, one foot four inches; diameter of the wheels or outer edges or raised part of the cylinder, two feet; general diameter of the other part of the cylinder, sixteen inches.

What I claim as my invention is—

The employment of a cylinder set with pickers for the purpose of picking up apples from the ground and the comb or slats for taking the same from the pickers and delivering them into a basket, in the manner and for the purpose herein described.

SAMUEL LANING.

Witnesses:
EDWARD BULLOCK,
PAUL C. LANING.